United States Patent
Jang et al.

(10) Patent No.: US 7,948,947 B2
(45) Date of Patent: May 24, 2011

(54) HANDOFF METHOD IN FMIPV6 FOR SEAMLESS TCP PACKET TRANSMISSIONS

(75) Inventors: Hee-jin Jang, Yongin-si (KR); Xiaoyu Liu, Yongin-si (KR); Youn-hee Han, Guri-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 824 days.

(21) Appl. No.: 11/324,302

(22) Filed: Jan. 4, 2006

(65) Prior Publication Data

US 2006/0176854 A1    Aug. 10, 2006

(30) Foreign Application Priority Data

Feb. 4, 2005    (KR) .................. 10-2005-0010747

(51) Int. Cl.
*H04Q 7/00* (2006.01)
*H04B 7/00* (2006.01)
(52) U.S. Cl. ....................................... 370/331; 370/338
(58) Field of Classification Search .................. 370/331, 370/338, 389, 401, 310.2, 469
See application file for complete search history.

(56) References Cited

U.S. PATENT DOCUMENTS

2003/0214923 A1* 11/2003 Omae et al. .................. 370/331
2006/0198345 A1*  9/2006 Chen ............................. 370/338

* cited by examiner

*Primary Examiner* — George Eng
*Assistant Examiner* — Khawar Iqbal
(74) *Attorney, Agent, or Firm* — Sughrue Mion, PLLC

(57) ABSTRACT

A handoff apparatus and method in FMIPv6 for seamless TCP packet transmissions. The handoff method includes steps of intercepting by a previous access router certain TCP packets sent from a correspondent node to a previous temporary address of a mobile node; and creating a TCP ACK by the previous access router in response to the certain TCP packets and sending by the previous access router the created TCP ACK to the correspondent node every time the certain TCP packets are forwarded to a new access router through a bi-directional tunnel. The handoff method has an advantage in that the packet transmission rate can be secured at the same level as the mobile node stays still during the performance of the handoff of the mobile node since the previous access router instead of the mobile node creates and sends the TCP ACK to the correspondent node during the performance of the handoff of the mobile node.

8 Claims, 2 Drawing Sheets

HANDOFF METHOD IN FMIPV6 FOR SEAMLESS TCP PACKET TRANSMISSIONS

CROSS-REFERENCE TO RELATED APPLICATIONS

This application claims priority from Korean Patent Application 10-2005-0010747, filed on Feb. 4, 2005, the entire contents of which are incorporated herein by reference.

BACKGROUND OF THE INVENTION

1. Field of the Invention

Methods and apparatuses consistent with the present invention relate to a handoff for mobile nodes, and more particularly to a handoff in FMIPv6 for seamless TCP packet transmissions.

2. Description of the Related Art

Recently, more people use wireless internet due to the rapid spread of the internet, advancement of wireless communication technologies, and improved performance of mobile terminals such as portable computers, Personal Digital Assistants (PDAs), etc. Under such wireless internet environments, the mobile terminals change their points for connections to networks frequently as they roam around. Such mobile terminals are referred to as mobile nodes.

In order to enable the mobile nodes to access the wireless internet, the high-quality internet service has to be served to the mobile nodes to the same extent as in a home network even though the mobile nodes may move to a foreign network out of their home network. Diverse technologies have been proposed for stable wireless internet services even when the mobile nodes change points for connections to networks. In particular, the Mobile Internet Protocol (IP) Working Group of the Internet Engineering Task force (IETF) has proposed a method for all mobile terminals to continuously use a specific identifier of IP address regardless of network connection points, and continues to define protocols for mobile IPs. Further, in order to solve a problem of the existing IP version 4 (IPv4) address system such as insufficient addresses for meeting increasing address demands, the Mobile IPv6 is being introduced to provide wireless internet services using the IPv6. The mobile IP version 6 (IPv6) is revised up to IETF Internet-Draft version 24 from the original proposal thereof, and may be turned into the Request For Comments (RFC) sooner or later.

The mobile IPv6 creates a new Care-of Address (CoA) upon handoff, and has inevitable delay factors such as movement detection, IP address configuration, and location update, until the completion of the newly-created address registration. The total delay caused by the delay factors can be large enough to be avoided when real-time applications or applications sensitive to losses are involved. As a technology for reducing such delays, the Fast Mobile IPv6 (FMIPv6) has been proposed which can immediately deliver data when a new link is detected as well as deliver packets to mobile terminals immediately at the time of connection to a new link.

However, even in such FMIPv6 environments, if the mobile nodes are not physically connected to any wireless access point during the handoff delay time period, the mobile nodes can not receive Transmission Control Protocol (TCP) packets sent from a correspondent node (CN) to communicate therewith, nor send an acknowledgement to the correspondent node CN. That is, the FMIPv6 environment causes communication cutoff events due to characteristics of the TCP during TCP-based communications of the mobile nodes, as the mobile nodes roam around, two occasions of which can be considered and described in detail below.

First, description will be made for the event where the handoff ends before the TCP retransmission timeout (RTO) is issued. In this case, during the handoff time period, the TCP window of the correspondent node CN does not slide since the correspondent node CN can not receive a TCP acknowledgement (ACK) from a mobile node, and, if the TCP ACK is sent through a new access router NAR after the mobile node completes its handoff, the window of the correspondent node CN slides again. That is, the packet transmission rate decreases only while the window of the correspondent node CN stops its sliding, and, after the handoff is completed, the packet transmissions resume with a window size previously used.

Next, description will be made for the event where the TCP timeout is caused due to a longer handoff time period during the handoff performance. In this case, since the correspondent node CN can not receive the TCP ACK until the TCP timeout occurs before the handoff completion, the window of the correspondent node CN does not slide, and reduces its size to 1 due to the TCP slow-start. If the window size is reduced as above, it takes much time to restore the window size up to the previous window size even when the TCP ACK is sent to the correspondent node CN through the new access router, after the mobile node completes the handoff. Further, since the correspondent node CN can send only as many packets as corresponds to the window size and due to the limitation for the number of packets that can be sent until the window size of the correspondent node CN is restored up to the previous window size, the packet transmission rate becomes lower.

SUMMARY OF THE INVENTION

An aspect of the present invention is to provide a handoff method in FMIPv6 for seamless TCP communications and improved TCP packet transmission rate by preventing communication cutoff events due to the characteristics of the TCP protocol during the handoff of a mobile node.

According to an aspect of the present invention, there is provided a handoff apparatus and a handoff method in FMIPv6 for seamless TCP packet transmissions, comprising steps of intercepting by a previous access router certain TCP packets sent from a correspondent node to a previous temporary address of a mobile node; and creating a TCP ACK by the previous access router in response to the certain TCP packets and sending by the previous access router the created TCP ACK to the correspondent node every time the certain TCP packets are forwarded to a new access router through a bi-directional tunnel.

In an exemplary embodiment of the present invention, TCP connections are preferably formed between the correspondent node and the previous access router.

In an exemplary embodiment of the present invention, TCP connections are formed between the previous access router and the mobile node.

In an exemplary embodiment of the present invention, if the TCP ACK is received from the previous access router, the correspondent node continues to send next TCP packets to the previous access router.

In an exemplary embodiment of the present invention, the previous access router stores TCP packets received from the correspondent node and sends the TCP packets to the mobile node after sending the corresponding TCP ACK to the correspondent node, and secures the delivery of TCP packets to the mobile node by re-transmitting the stored TCP packets when the packet was lost during delivery.

BRIEF DESCRIPTION OF THE DRAWINGS

The above aspects of the present invention will be more apparent by describing exemplary embodiments of the present invention with reference to the accompanying drawings, in which.

DETAILED DESCRIPTION OF EXEMPLARY EMBODIMENTS

Figure 1:
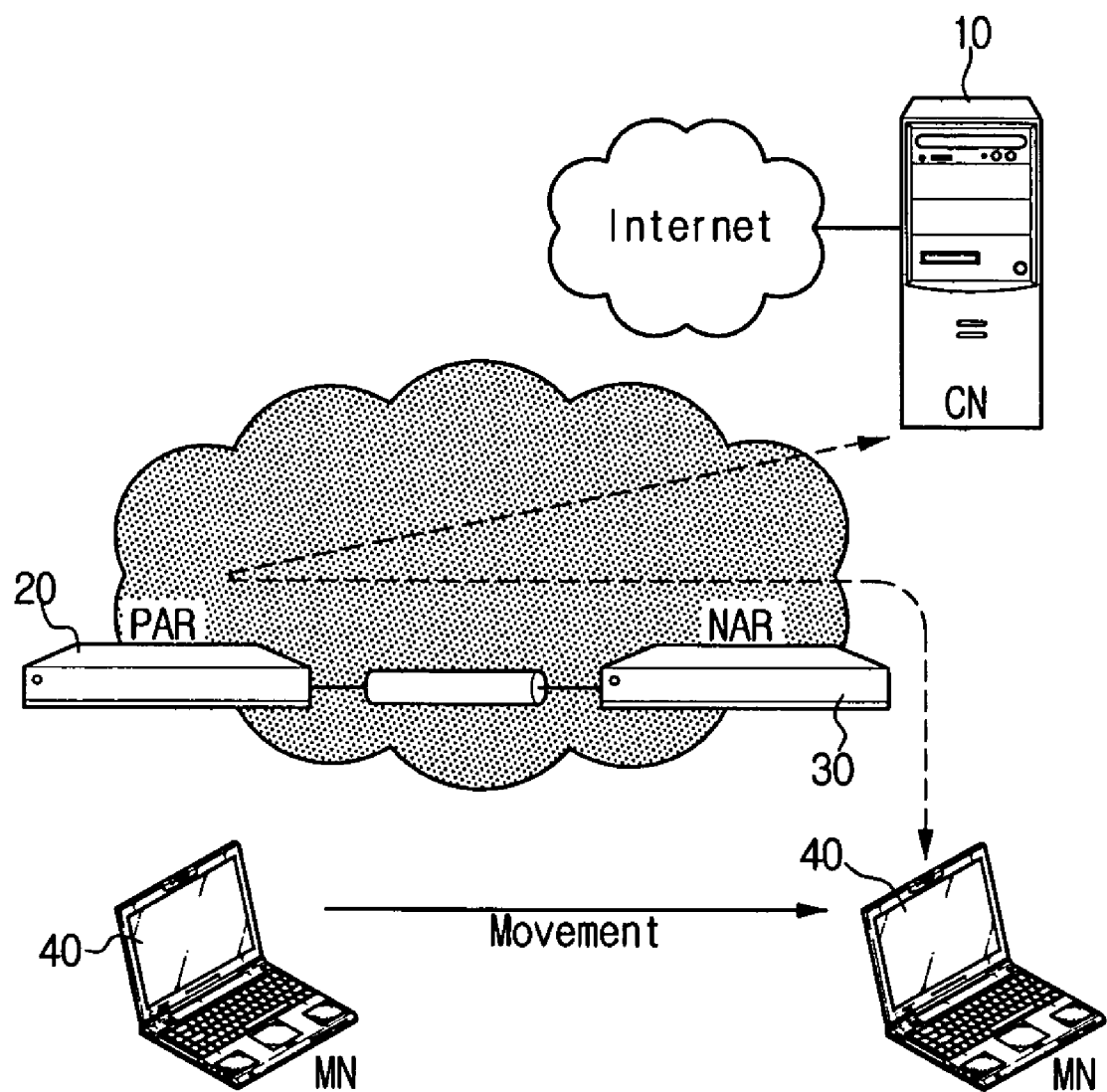
FIG. 1 is a view showing a basic FMIPv6 structure for performing an exemplary embodiment of the present invention.

FIG. 1 is a view for showing a basic FMIPv6 structure for performing an exemplary embodiment of the present invention. In FIG. 1, a reference numeral 20 denotes a previous access router (PAR), reference numeral 30 denotes a new access router (NAR), reference numeral 40 denotes a mobile node (MN), and reference numeral 10 denotes a correspondent node (CN) 10 communicating with the mobile node 40.

If the mobile node 40 moves to the new access router 30 from the previous access router 20, it is assumed that the mobile node 40 or the previous access router 20 can obtain two-layer information of the new access router 30 in advance before two-tier handoff is completed. If the mobile node 40 obtains the two-layer information of the new access router 30, the mobile node 40 requests the previous access router 20 for IP-layer information on the new access router 30.

The previous access router 20 uses the existing information on the new access router 30 to configure in advance a New CoA (NCoA) that will be used for the new access router 30, and notifies the mobile node 40 of the NCoA, so as to enable the mobile node 40 to perform a binding update immediately when linked to a new network. Further, the previous access router 20 sets up a bi-directional tunnel with the new access router 30 and tunnels packets to the new access router 30 in order to prevent loss of packets sent from the correspondent node 10 before the binding update is completed for the NCoA.

The previous access router 20 according to an exemplary embodiment of the present invention includes a TCP ACK generation module. That is, as soon as packets are tunneled to the new access router 30 through a set bi-directional tunnel, the previous access router 20 generates and sends a TCP ACK to the correspondent node 10. If the correspondent node 10 receives the TCP ACK, the window of the correspondent node 10 slides. If the window of the correspondent node 10 slides as above, the correspondent node 10 can send next TCP packets seamlessly.

Figure 2:
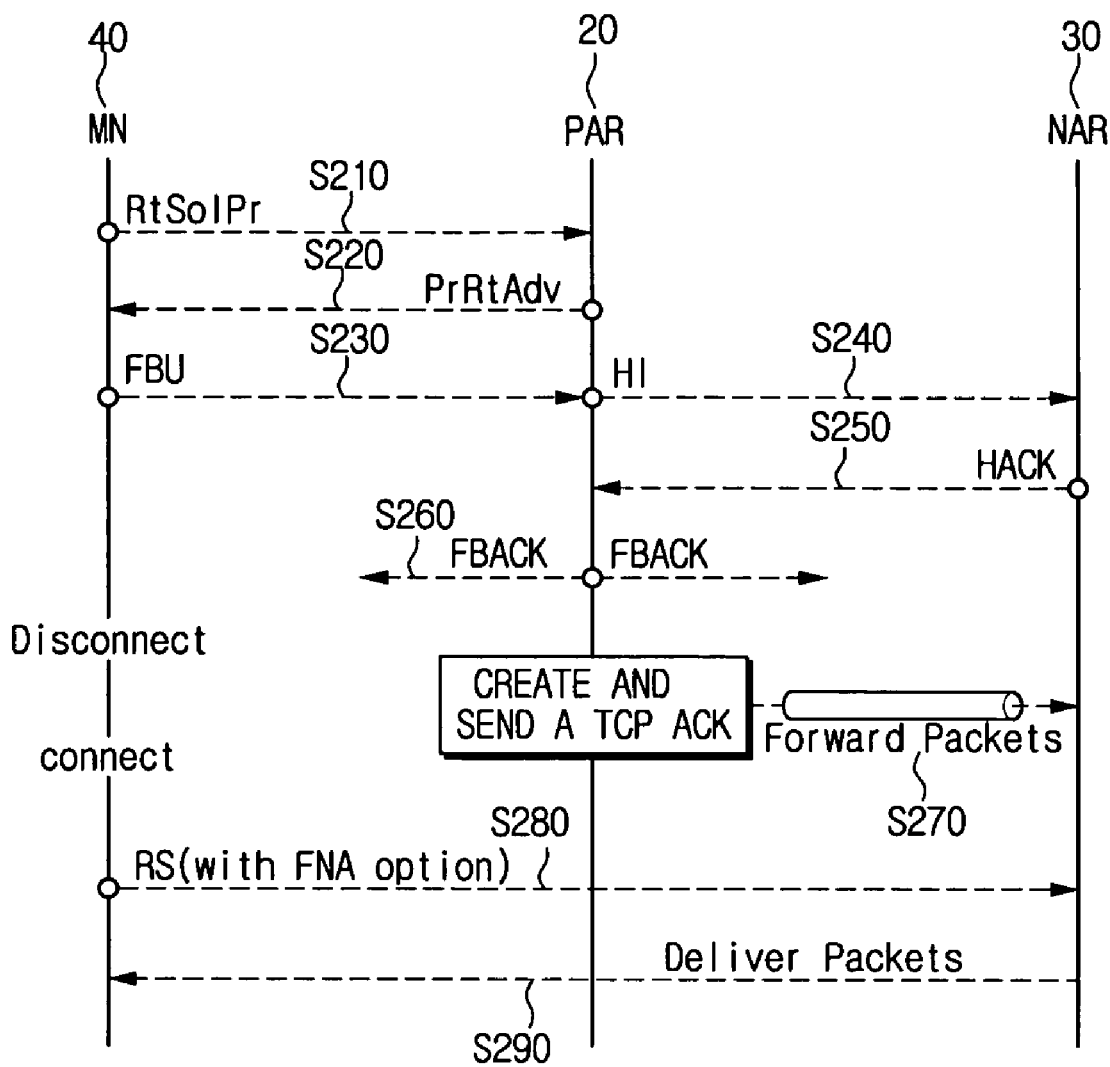
FIG. 2 is a flow chart explaining a handoff method in FMIPv6 for seamless TCP packet transmissions according to an exemplary embodiment of the present invention.

FIG. 2 is a flow chart explaining a handoff method in FMIPv6 for seamless TCP packet transmissions according to an exemplary embodiment of the present invention. In FIG. 1 and FIG. 2, if the mobile node 40 detects its movement to the new access router 30, the mobile node 40 sends to the previous access router 20 a Router Solicitation for Proxy Advertisement (RtSolPR) message requesting for information on the new access router 30 (S210). In this case, the RtSolPR message contains a link-layer identifier (ID) with respect to the new access router 30. If a wireless local area network (LAN) is used, the link-layer ID can be the (B)SSID of the new access router 30.

The previous access router 20 receiving the RtSolPR message uses the existing information on the new access router 30 to configure a new temporary address NCoA, and sends the NCoA to the mobile node 40 in the form of a Proxy Router Advertisement (PrRtAdv) message (S220). Here, it is assumed that the previous access router 20 and the new access router 30 can communicate with each other and share the information on each other. If the previous access router 20, rather than the mobile node 40, detects the movement of the mobile node 40, the previous access router 20 sends to the mobile node 40 the PrRtAdv message containing information on the new access router 30 without the RtSolPR message.

The mobile node 40 receiving the PrRtAdv message sends to the previous access router 20 the Fast Binding Update (FBU) message requesting for the binding of the previous temporary address and the new access router 30 (S230). If the previous access router 20 receives the FBU, the previous access router 20 sends a HI message to the new access router 30 to set up a bi-directional tunnel with the new access router 30 (S240). The HI message requests the new access router 30 for authentication with respect to the newly configured temporary address NCoA.

The new access router 30 sends the HACK message in response so that the bi-directional tunnel is configured, and authenticates on the new temporary address NCoA (S250). The previous access router 20 sends the authentication of the new temporary address NCoA to the mobile node 40 through FBACK (S260), intercepts packets sent from the correspondent node 10 to the previous temporary address of the mobile node 40, and forwards the intercepted packets to the new access router 30 through the bi-directional tunnel (S270). At the time when the previous access router 20 according to an exemplary embodiment of the present invention tunnels the TCP packets received from the correspondent node 10 to the new access router 30, the previous access router 20 creates and sends a TCP ACK to the correspondent node 10. If the correspondent node 10 receives the TCP ACK, the window of the correspondent node 10 slides. As above, if the window of the correspondent node 10 slides, the correspondent node 10 can send next TCP packets seamlessly.

If the new access router 30 configures a new link with respect to the mobile node 40, the mobile node 40 puts the Fast Neighbor Advertisement (FNA) notifying of its existence in the Router Solicitation (RS) message for sending (S280). Next, the new access router 30 delivers data to the mobile node 40 (S290), and the mobile node 40 uses the new temporary address NCoA to perform the binding update procedures coded in the mobile Ipv6.

As stated above, the present invention has an advantage in that the packet transmission rate can be secured at the same level as the mobile node stays still during the performance of the handoff of the mobile node since the previous access router PAR instead of the mobile node MN creates and sends the TCP ACK to the correspondent node CN during the performance of the handoff of the mobile node MN.

The foregoing embodiments are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A handoff method in a Fast Mobile Internet Protocol version 6 (FMIPv6) address system for seamless Transmission Control Protocol (TCP) packet transmissions, the handoff method comprising:

intercepting by a previous access router certain TCP packets sent from a correspondent node to a previous temporary address of a mobile node; and creating a TCP acknowledgement (ACK) by the previous access router in response to the certain TCP packets and sending by the previous access router the created TCP ACK to the correspondent node every time the certain TCP packets are forwarded to a new access router through a bi-directional tunnel, wherein the previous access router sends the TCP ACK to the correspondent node during handoff, and wherein the previous access router stores the certain TCP packets received from the correspondent node and sends the stored certain TCP packets to the mobile node after sending the corresponding TCP ACK to the correspondent node.

2. The handoff method as claimed in claim 1, wherein TCP connections are formed between the correspondent node and the previous access router.

3. The handoff method as claimed in claim 1, wherein TCP connections are formed between the previous access router and the mobile node.

4. The handoff method as claimed in claim 1, wherein, if the TCP ACK is received from the previous access router, the correspondent node continues to send next TCP packets to the previous access router.

5. The handoff method as claimed in claim 4, wherein the previous access router secures delivery of the certain TCP packets to the mobile node by re-transmitting the stored TCP packets when the packet was lost during delivery.

6. The handoff method as claimed in claim 1, wherein the previous access router obtains two-layer information of the new access router in advance before two-tier handoff is completed.

7. The handoff method as claimed in claim 1, wherein the previous access router configures a new Care-of Address (COA) corresponding to the new access router and notifies the mobile node of the new COA to enable the mobile node to perform a binding update when linked to a new network.

8. The handoff method as claimed in claim 1, wherein the mobile node transmits a request to the previous access router requesting information about the new access router, in response to detecting movement of the mobile node to the new access router.

* * * * *